United States Patent
Taylor

(10) Patent No.: US 10,089,235 B1
(45) Date of Patent: Oct. 2, 2018

(54) DYNAMIC TRIM PROCESSING WITH DISK CACHING

(71) Applicant: Citrix Systems, Inc., Fort Lauderdale, FL (US)

(72) Inventor: Alton Taylor, Gerrards Crossbuckinghamshire (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/663,255

(22) Filed: Jul. 28, 2017

(51) Int. Cl.
*G06F 12/08* (2016.01)
*G06F 12/0871* (2016.01)
*G06F 12/0868* (2016.01)

(52) U.S. Cl.
CPC ...... *G06F 12/0871* (2013.01); *G06F 12/0868* (2013.01)

(58) Field of Classification Search
None
See application file for complete search history.

(56) References Cited

U.S. PATENT DOCUMENTS

| 2013/0219106 | A1* | 8/2013 | Vogan | G06F 12/0246 711/103 |
| 2013/0326161 | A1* | 12/2013 | Cohen | G06F 3/061 711/154 |
| 2015/0205717 | A1* | 7/2015 | Lin | G06F 12/0246 711/103 |
| 2017/0102884 | A1* | 4/2017 | Kim | G06F 3/0608 |

\* cited by examiner

*Primary Examiner* — Gary W. Cygiel
(74) *Attorney, Agent, or Firm* — Fox Rothschild LLP; Robert J. Sacco; Carol E. Thorstad-Forsyth

(57) ABSTRACT

Systems and methods for handling operation requests in a computing device. The methods comprise: queuing a first I/O operation and first TRIM operation in a first list of operations; analyzing the first TRIM operation for a plurality of block portions of a disk cache to determine a size thereof; estimating a first amount of time to complete the first TRIM operation; comparing the first amount of time to a first threshold value; selectively dividing the first TRIM operation into at least a second TRIM operation for first block portions contained in the plurality of block portions and at least a third TRIM operation for second block portions contained in the plurality of block portions, if the first amount of time is greater than the first threshold value; performing the first I/O operation followed by the second TRIM operation; and queuing the third TRIM operation in a second list of operations.

20 Claims, 9 Drawing Sheets

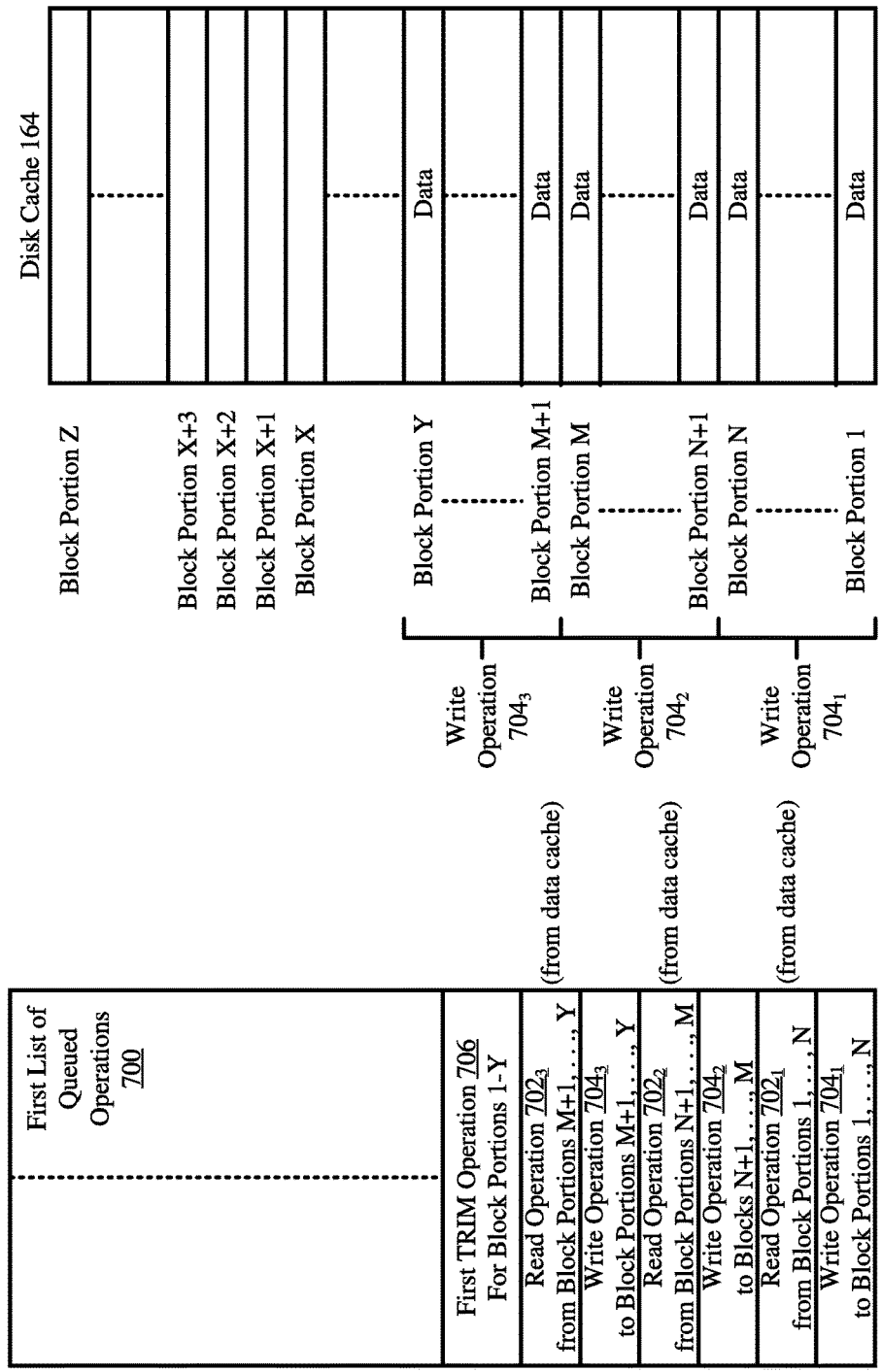

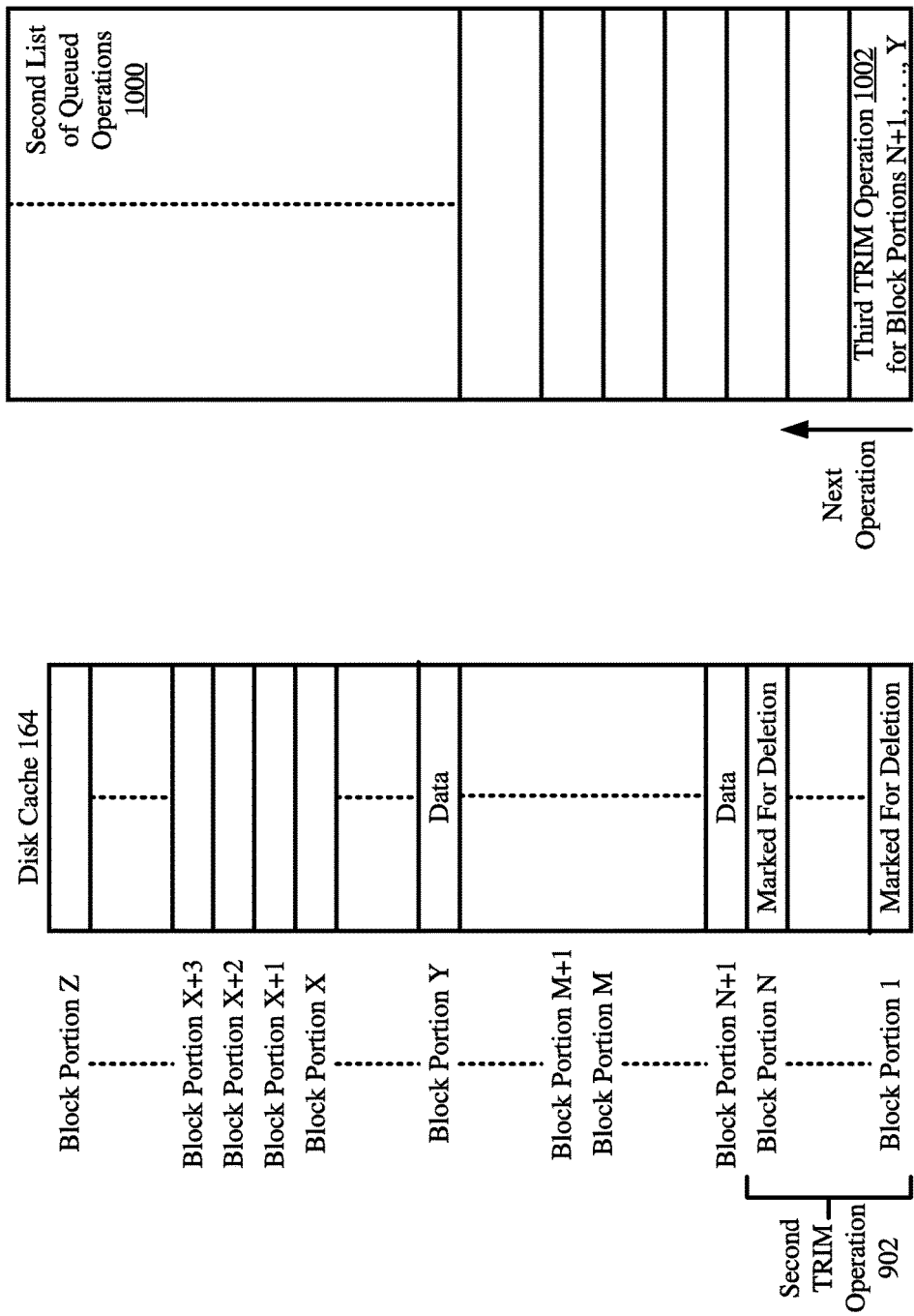

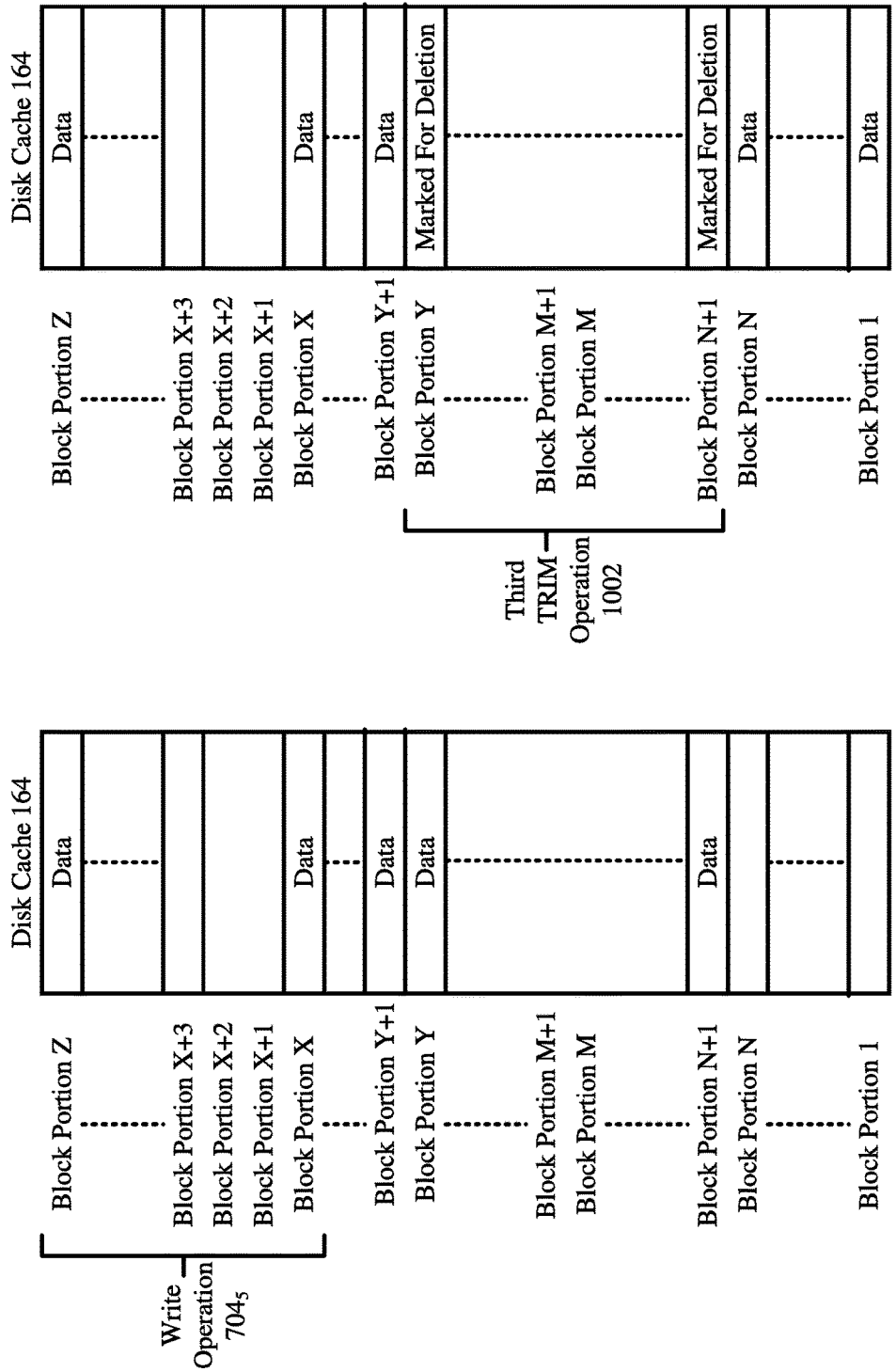

DYNAMIC TRIM PROCESSING WITH DISK CACHING

BACKGROUND

Statement of the Technical Field

The present disclosure relates generally to computing systems. More particularly, the present disclosure relates to implementing systems and methods for dynamic TRIM processing with disk caching to provide a consistent system Input/Output ("I/O") response.

Description of the Related Art

Machine Creation Services ("MCSs") is a component of a virtual desktop platform that can be used to design and deliver virtual desktop images. Using Application Programming Interfaces ("APIs") from an underlying hypervisor, MCSs configure, start, stop and delete Virtual Machines ("VMs"). The MCSs use copies of a master VM to provision virtual desktops. The clones include an differencing hard disk, an identity hard disk and a personal virtual disk. The MCSs have an I/O optimization feature that uses disk caching to offload temporary write operations to shared storage for VMs.

A disk cache is a mechanism for improving the time it takes to read from and write to a hard disk. The disk cache can be part of the hard disk or a portion of a Random Access Memory ("RAM") that is reserved for use by the hard disk. During operation, a program running on a computing device may need access to new data. In this case, an Operating System ("OS") first checks to see if the new data is stored in the disk cache. If so, the new data is retrieved from the disk cache. If not, the OS performs operations to read the new data from the hard disk. Disk caching improves the computing device's overall performance since data can be accessed much faster from the disk cache as opposed to the hard disk.

A TRIM command ("TRIM") allows the OS to inform a Solid State Drive ("SSD") which blocks of data are no longer considered in use and can be erased. TRIM processing improves performance of the SSD. The SSD may organize data into pages which are grouped together in blocks. Data can be read and written at the page level but can only be erased at the block level. For a deletion operation, the OS sends a TRIM command to the SSD for marking given pages for deletion. Notably, the pages are not actually erased from memory at this time. For a write operation, the pages marked for deletion are grouped into a block and erased to make room for the new data to be written to the SSD.

SUMMARY

The present disclosure concerns implementing systems and methods for handling operation requests in a computing device. The methods comprise: queuing at least one first I/O operation (e.g., a read operation or a write operation) and a first TRIM operation for a plurality of block portions of a disk cache in a first list of operations to be performed by the computing device; analyzing the first TRIM operation to determine a size thereof; estimating a first amount of time to complete the first TRIM operation; and comparing the first amount of time to a first threshold value. If the first amount of time is less than the first threshold value, then the first I/O operation is performed followed by the first TRIM operation. In contrast, if the first amount of time is greater than the first threshold value, then the first TRIM operation is selectively divided into at least a second TRIM operation for first block portions contained in the plurality of block portions of the disk cache and at least a third TRIM operation for second block portions contained in the plurality of block portions of the disc cache. Thereafter, the first I/O operation is performed followed by the second TRIM operation, and the third TRIM operation is queued in a second list of operations to be performed by the computing device. Notably, an estimated amount of time to complete the second TRIM operation is less than the first threshold value.

In some scenarios, the methods further comprise: queuing at least one second I/O operation in the first list; estimating a second amount of time to complete the at least one second I/O operation; setting a value of a second threshold value based on the second amount of time; estimating a third amount of time to complete the third TRIM operation; and determining if the third amount of time is less than the second threshold value. If the third amount of time is less than the second threshold value, the second I/O operation is performed followed by the third TRIM operation.

If the second I/O operation comprises a write operation for writing data to the first block portions, then the data is written to other block portions of the disc cache that are not contained in the first and second block portions. If the second I/O operation comprises a read operation for reading data in the second block portion, then an empty data set is returned. If the second I/O operation comprises a read operation for reading data in the second block portion, then the data is read (a) from the disk cache if it has not yet been erased therefrom or (b) from a memory or hard disk depending on whether the data has been flushed out of the disk cache to the hard disk.

BRIEF DESCRIPTION OF THE DRAWINGS

The present solution will be described with reference to the following drawing figures, in which like numerals represent like items throughout the figures.

FIG. 7 is an illustration of a first illustrative queued operations list.

FIG. 8 is an illustration of an illustrative disk cache with data written thereto in accordance with write operations contained in the queued operations list of FIG. 7.

FIG. 9 is an illustration of an illustrative disk cache with data marked for deletion in accordance with a second TRIM operation determined based on a first TRIM operation contained in the queued operations list of FIG. 7.

FIG. 10 is an illustration of a second illustrative queued operations list containing a third TRIM operation determined based on a first TRIM operation contained in the queued operations list of FIG. 7.

FIG. 13 is an illustration of a disk cache having data written thereto in accordance with write operations contained in the queued operations list of FIG. 11.

FIG. 14 is an illustration of a disk cache having data marked for deletion in accordance with the third TRIM operation queued in the second list of FIG. 10.

DETAILED DESCRIPTION

Figure 1:
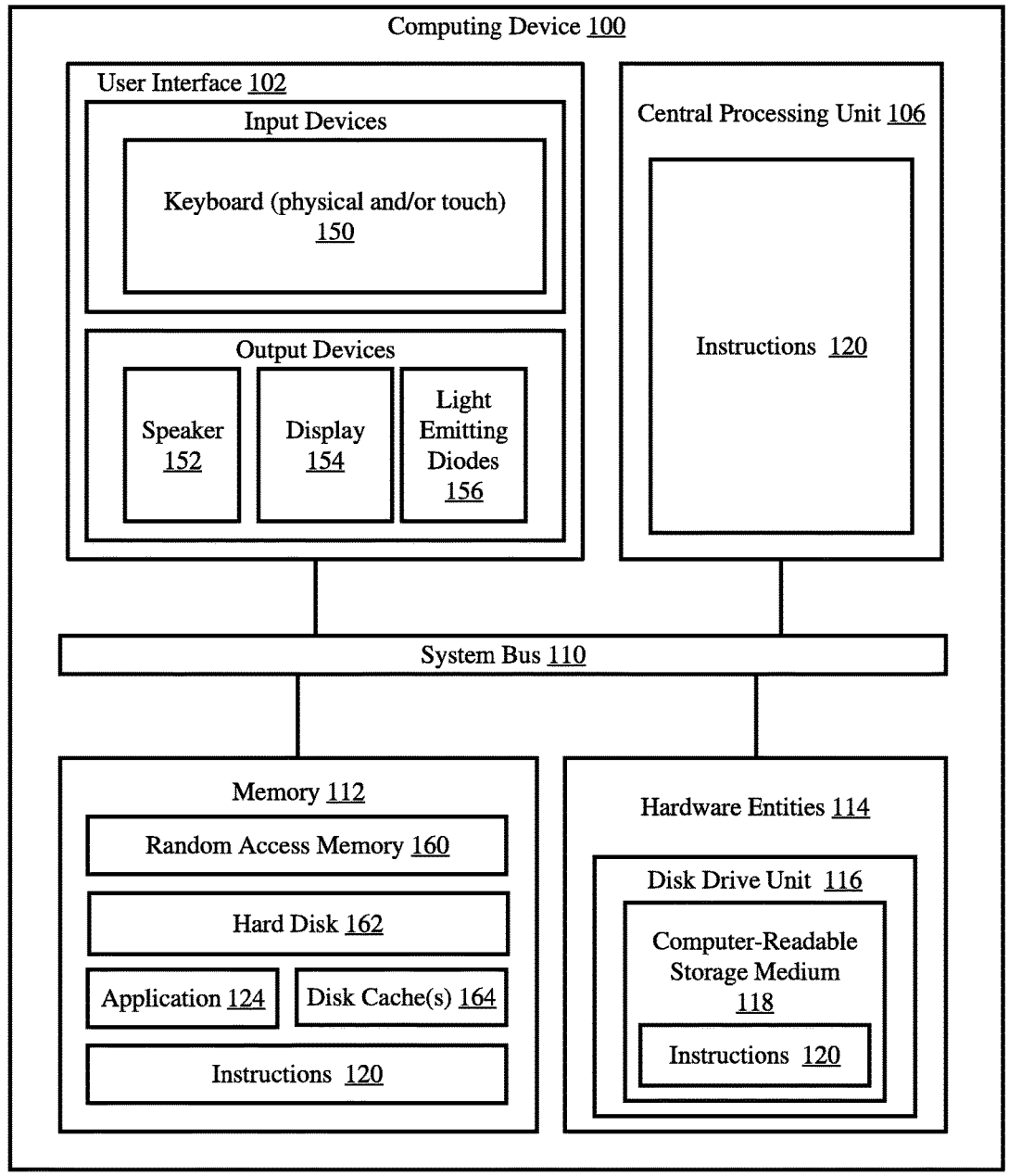
FIG. 1 is an illustration of an illustrative computing device.
Figures 2, 3:
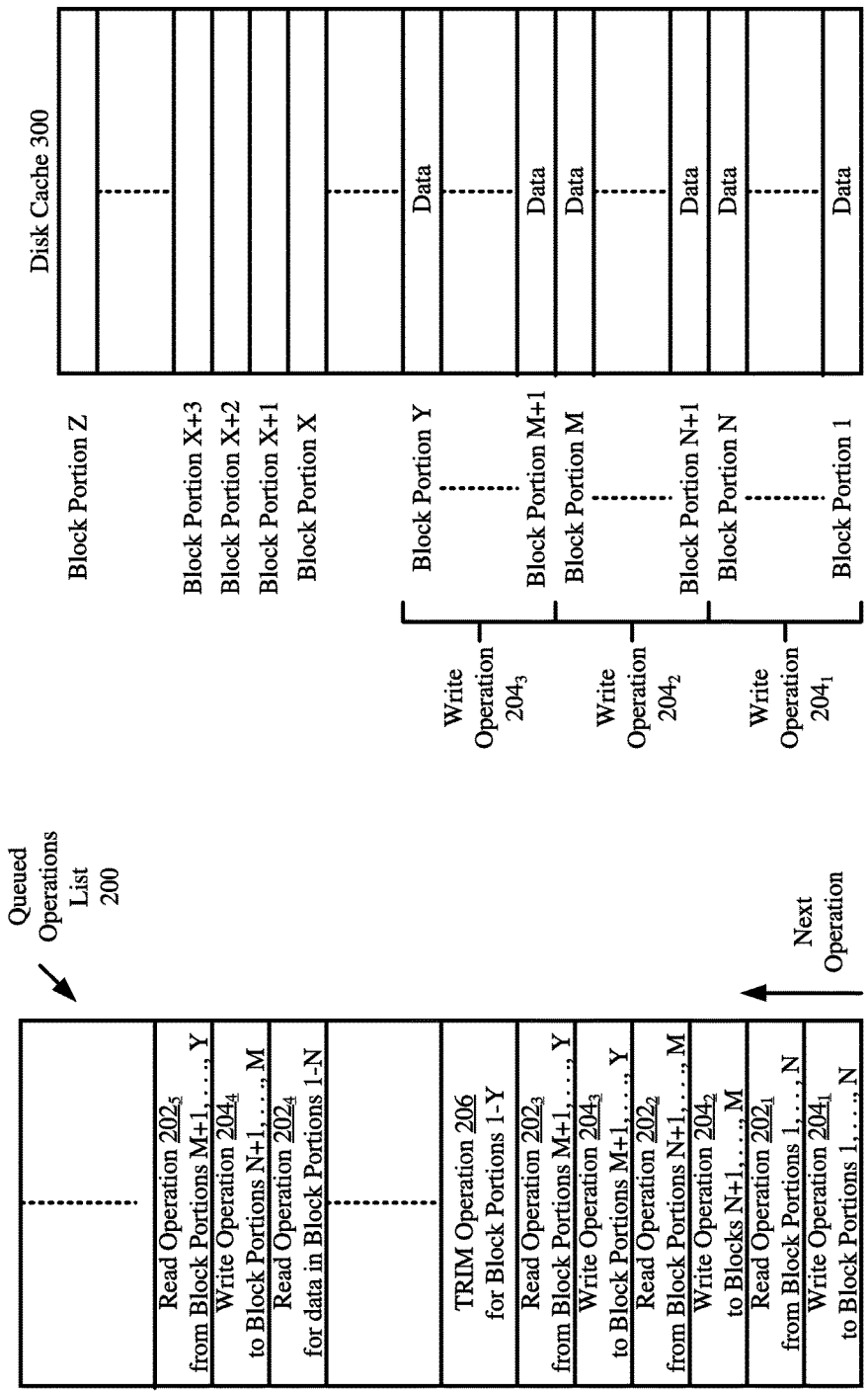
FIG. 2 is an illustration of an illustrative queued operations list.
FIG. 3 is an illustration of an illustrative disk cache with data written thereto in accordance with write operations contained in the queued operations list of FIG. 2.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns implementing systems and methods for dynamic TRIM processing with disk caching to provide a consistent system I/O response. The word "TRIM" is used here in relation to the present solution in a general sense. A TRIM operation includes, but is not limited to, ATA TRIM operations, SCSI UNMAP operations and/or other similar operations. TRIM processing on Solid State Drives ("SSDs") can be queued to improve performance. However, the Data Set Range ("DSR") can be quite large which reduces overall system responsiveness. Dynamically adjusting the TRIM processing with disk caching provides a consistent system I/O response. This dynamic adjustment of TRIM processing distinguishes from existing solutions by not only queuing TRIM commands but also breaking the TRIM commands into chunks to maintain a system I/O response. Also, disk caching using system memory handles new read and write operations to dynamically trimmed blocks. The system I/O response is measured to help manage the amount of outstanding dynamically trimmed blocks.

Referring now to FIG. 1, there is provided an illustration of an exemplary computing device 100. Computing device 100 may include more or less components than those shown in FIG. 1. However, the components shown are sufficient to disclose an illustrative embodiment implementing the present solution. The hardware architecture of FIG. 1 represents one illustration of a representative computing device implementing a dynamic TRIM processing with disk caching to provide a consistent system I/O response. As such, the computing device 100 of FIG. 1 implements at least a portion of each method described herein.

Some or all components of the computing device 100 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 1, the computing device 100 comprises a user interface 102, a CPU 106, a system bus 110, a memory 112 connected to and accessible by other portions of computing device 100 through system bus 110, and hardware entities 114 connected to system bus 110. The user interface can include input devices and output devices, which facilitate user-software interactions for controlling operations of the computing device 100. The input devices include, but are not limited, a physical and/or touch keyboard 150. The output devices include, but are not limited to, a speaker 152, a display 154, and/or light emitting diodes 156.

At least some of the hardware entities 114 perform actions involving access to and use of memory 112. Memory 112 includes, but is not limited to, a RAM 160, a hard disk 162, a disk cache 164, and/or a Compact Disc Read Only Memory ("CD-ROM") (not shown in FIG. 1).

Hardware entities 114 can include a disk drive unit 116 comprising a computer-readable storage medium 118 on which is stored one or more sets of instructions 120 (e.g., software code) configured to implement one or more of the methodologies, procedures, or functions described herein. The instructions 120 can also reside, completely or at least partially, within the memory 112 and/or within the CPU 106 during execution thereof by the computing device 100. The memory 112 and the CPU 106 also can constitute machine-readable media. The term "machine-readable media", as used here, refers to a single medium or multiple media (e.g., a centralized or distributed database, and/or associated caches and servers) that store the one or more sets of instructions 120. The term "machine-readable media", as used here, also refers to any medium that is capable of storing, encoding or carrying a set of instructions 120 for execution by the computing device 100 and that cause the computing device 100 to perform any one or more of the methodologies of the present disclosure.

In some scenarios, the hardware entities 114 include an electronic circuit (e.g., a processor) programmed for facilitating TRIM processing. In this regard, it should be understood that the electronic circuit can access and run software applications 124 installed on the computing device 100. One software application 124 is generally operative to facilitate the provision of dynamic TRIM processing with disk caching. The functions of the software application 124 will become apparent as the discussion progresses.

Notably, the disk cache 164 is used to queue read operations, write operations, and TRIM operations. The TRIM operations may take longer to process as compared to the read and write operations. Depending on the DSRs and estimated times to process the TRIM operations, the ranges are dynamically trimmed where some blocks from the ranges are trimmed (i.e., erased to make room for new data to be stored in memory) while others are left pending for additional processing.

Figures 4, 5:
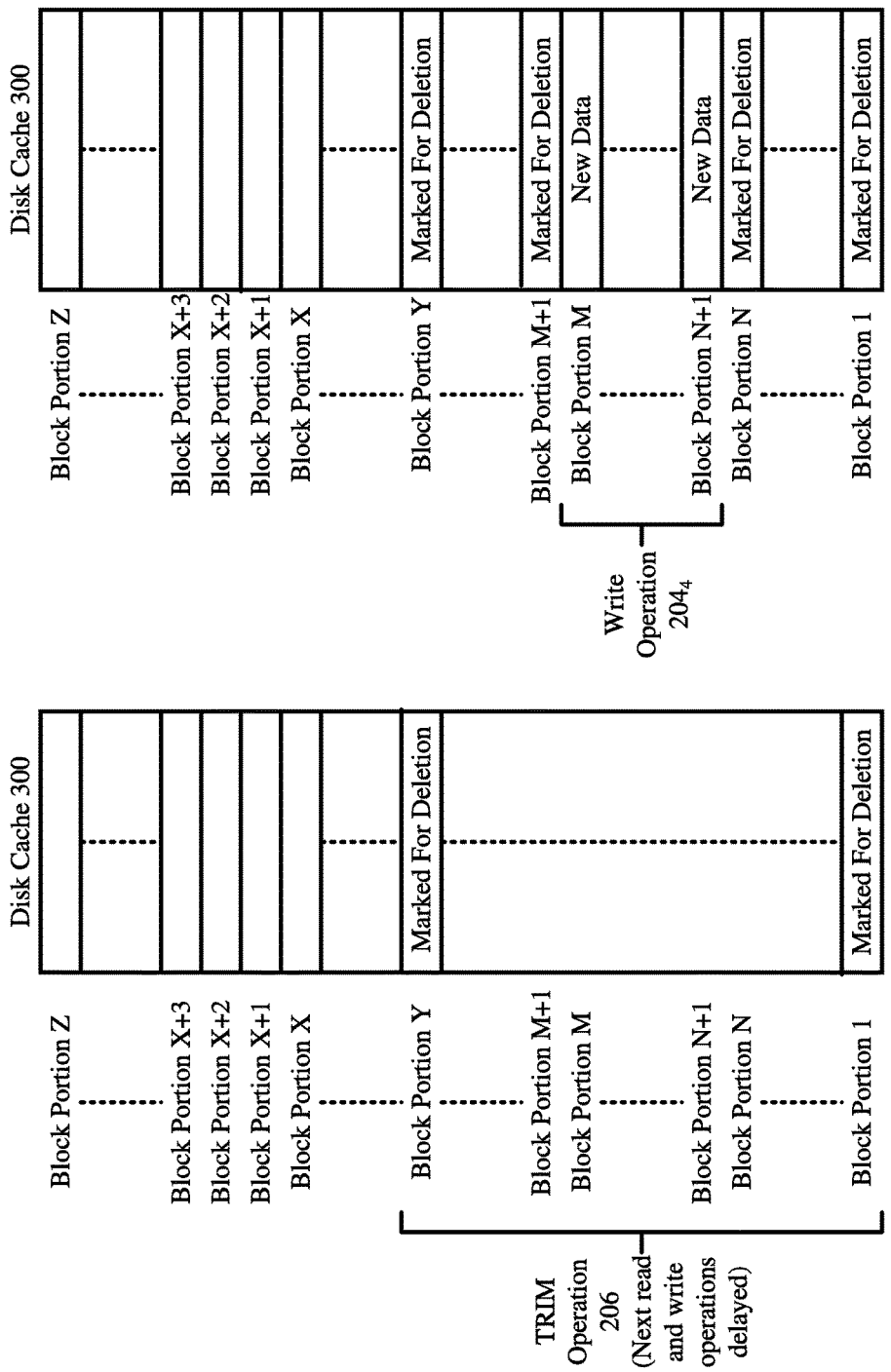
FIG. 4 is an illustration of an illustrative disk cache with data marked for deletion in accordance with a TRIM operation contained in the queued operations list of FIG. 2.
FIG. 5 is an illustration of an illustrative disk cache with data written to trimmed block portions in accordance with a write operation contained in the queued operations list of FIG. 2.

Referring now to FIGS. 2-5, illustrations are provided which are useful for understanding a conventional operation queuing process. As operation requests are received by a CPU, they are queued in a list 200 within a disc cache 300. The operations are performed in the order specified by the list 200. For example, a first write operation $204_1$ is first performed to write data to block portions 1, . . . , N of the disk cache 300. Next, a first read operation $202_1$ is performed to read the data stored in block portions 1, . . . , N from the disk cache 300. Then, a second write operation $204_2$ is performed to write data to block portions N+1, . . . , M of the disk cache 300, followed by a second read operation $202_2$. Subsequently, a third write operation $204_3$ is performed to write data to block portions M+1, . . . , Y of the disk cache 300, followed by a third read operation $202_3$. Upon completing the third read operation $202_3$, a TRIM operation 206 is performed in which block portions 1, . . . , Y of the disk cache 300 are marked for deletion, as shown by FIG. 4.

At some later time, a fourth read operation $202_4$ is performed to read data that was previously stored in block portions 1, . . . , N of the disc cache 300. Since this data is marked for deletion, the data is read from the hard disk if it was flushed thereto rather than from the disc cache 300 during the fourth read operation $202_4$. Next, a fourth write operation $204_4$ is performed in which (a) data block portions N+1, . . . , N are erased and (b) new data is written to block portions N+1, . . . , N of the disk cache 300, as shown by FIG. 5.

Despite the advantages of the above operation queuing process, it suffers from certain drawbacks. For example, the TRIM operation 206 takes a relatively long amount of time to complete, and therefore affects adversely overall system responsiveness to I/O operation requests. Therefore, an improved operation queuing process is needed in which the overall system responsiveness to I/O operation requests is improved. The present solution provides such an improved operation queuing process.

Figure 6A:
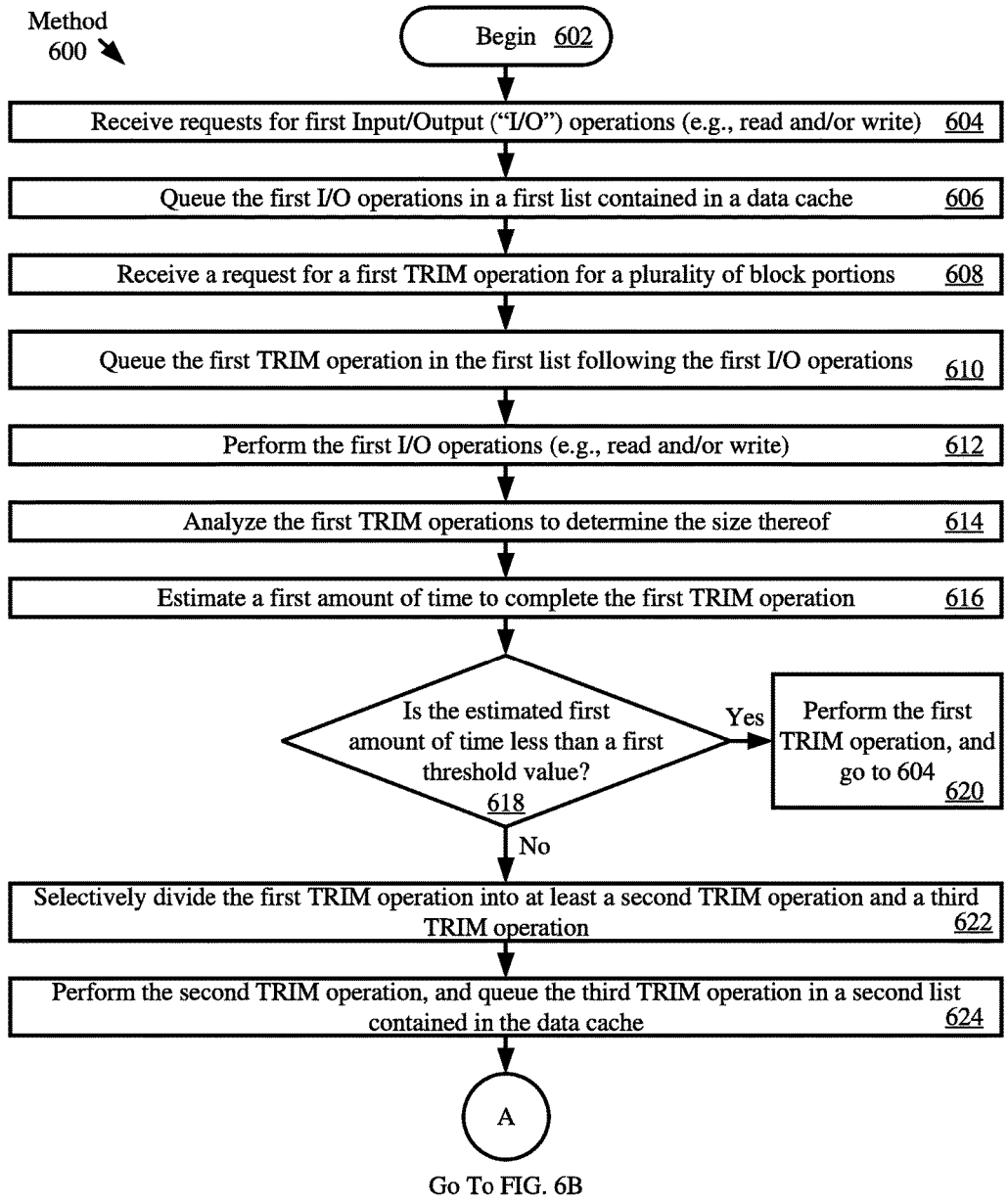
FIGS. 6A-6B (collectively referred to as "FIG. 6") is a flow diagram of an illustrative method for dynamic TRIM processing with disk caching to provide a consistent system I/O response.
Figure 6B:
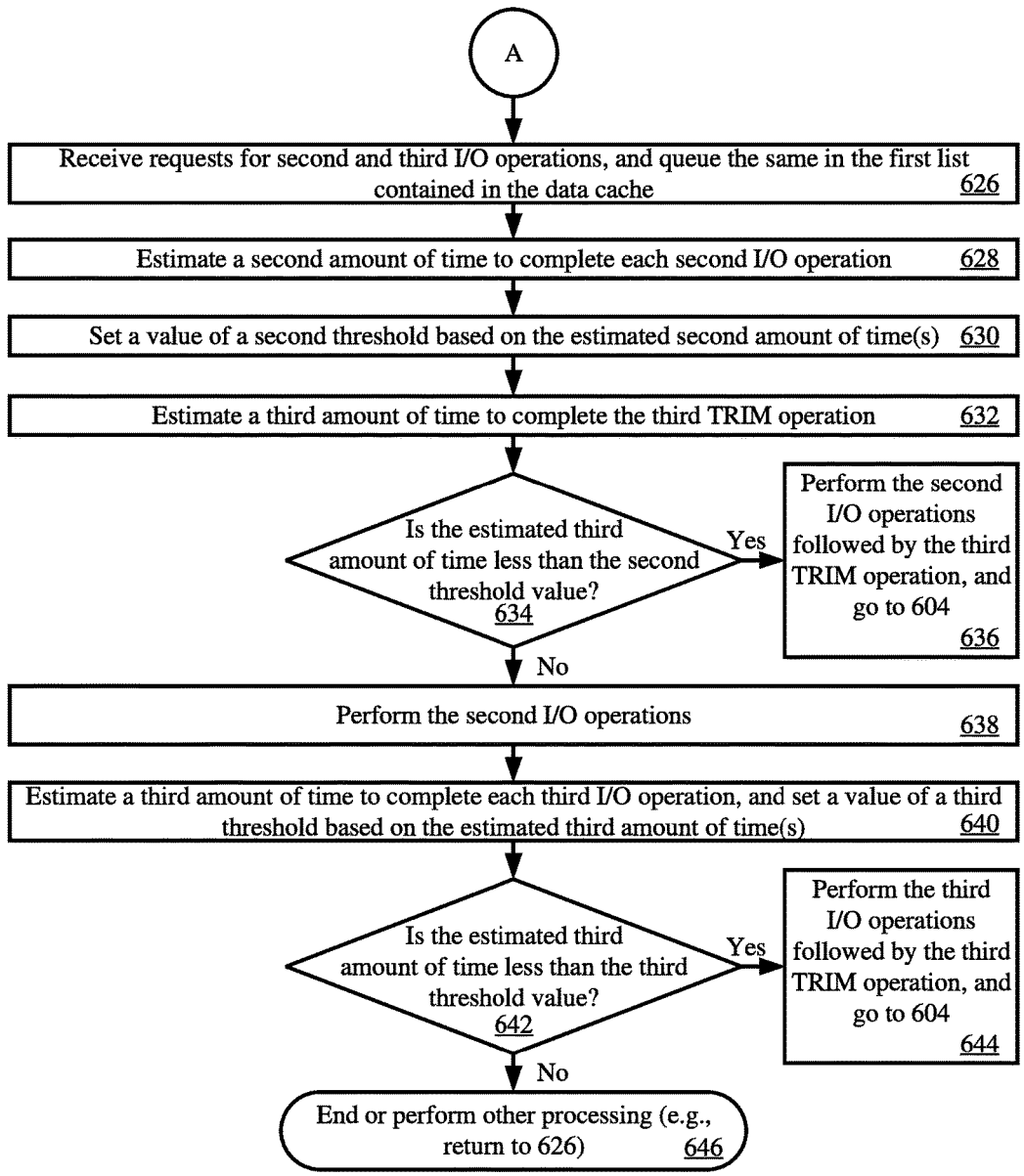

Referring now to FIGS. 6A-6B, there is provided a flow diagram of an illustrative method 600 for handling operation requests in accordance with the present solution. Method 600 begins with 602 and continues with 604 where requests for first I/O operations are received at a processing unit (e.g., CPU 106 of FIG. 1). The first I/O operations include, but are not limited, to read operations and/or write operations. The first I/O operations are queued in a first list contained in a data cache (e.g., disc cache 164 of FIG. 1).

An illustration of an illustrative first list 700 of queued operations is provided in FIG. 7. The queued operations include write operations $704_1$, $704_2$, $704_3$ and read operations $702_1$, $702_2$, $702_3$. In FIG. 7, the write and read operations are shown in an alternating order (i.e., each write operation is followed by a read operation). The present solution is not limited in this regard. The read operations and/or write operations can be in any order. Also, the number of read operations can be the same as or different than the number of write operations.

In 608, the processing unit receives a request for a first TRIM operation for a plurality of block portions in the disc cache. The first TRIM operation is queued in the first list following the first I/O operations. For example, as shown in FIG. 7, the first TRIM operation 706 is queued in list 700 after the read operation $702_3$.

In 612, the first I/O operations are performed. For example, as shown in FIGS. 7-8, data is written to block portions 1, . . . , N of the data cache 164 in accordance with write operation $704_1$. This data is then read from the data cache 164 in accordance with the read operation $702_1$. Similarly, data is written to block portions N+1, . . . , M of the data cache 164 in accordance with write operation $704_2$. This data is then read from the data cache 164 in accordance with the read operation $702_2$. Likewise, data is written to block portions M+1, . . . , Y of the data cache 164 in accordance with write operation $704_3$. This data is then read from the data cache 164 in accordance with the read operation $702_3$.

Once 612 is completed, the processing unit performs trimming related tasks in 614-622. The trimming related tasks involve: analyzing a first TRIM operation (e.g., TRIM operation 706 of FIG. 7) to determine a size thereof; estimating a first amount of time to complete the first TRIM operation; and determining if the estimated first amount of time is less than a first threshold value. The first threshold value can be a pre-defined value. If the estimated first amount of time is less than the first threshold value [618: YES], the first TRIM operation is performed as shown by 620. Upon completing the first TRIM operation, method 600 returns to 604.

In contrast, if the estimated first amount of time is greater than the first threshold value [618:NO], then 622 is performed where the first TRIM operation is divided into at least a second TRIM operation for first block portions contained in the plurality of block portions and a third TRIM operation for second block portions contained in the plurality of block portions. First and second block portions are of the same or different size, and contain different ones of the block portions comprising the plurality. Notably, an estimated amount of time to complete at least the second TRIM operation is less than the first threshold value. Accordingly, the second TRIM operation is performed in 624 since there will not be a significant impact on the system's responsiveness to I/O requests. For example, as shown in FIG. 9, only the data in block portions 1, . . . , N are marked for deletion in accordance with a second TRIM operation 902. The data in block portions N+1, . . . , Y are not marked for deletion at this time as such operation would cause an undesirable effect on the system's responsiveness to I/O requests. Accordingly, 624 also involves queueing the third TRIM operation in a second list of queued operations. An illustration of an illustrative second list 1000 is provided in FIG. 10. As shown in FIG. 10, a third TRIM operation 1002 is queued in the list 1000. After completing 624, method 600 continues with 626 of FIG. 6B.

Figures 11, 12:
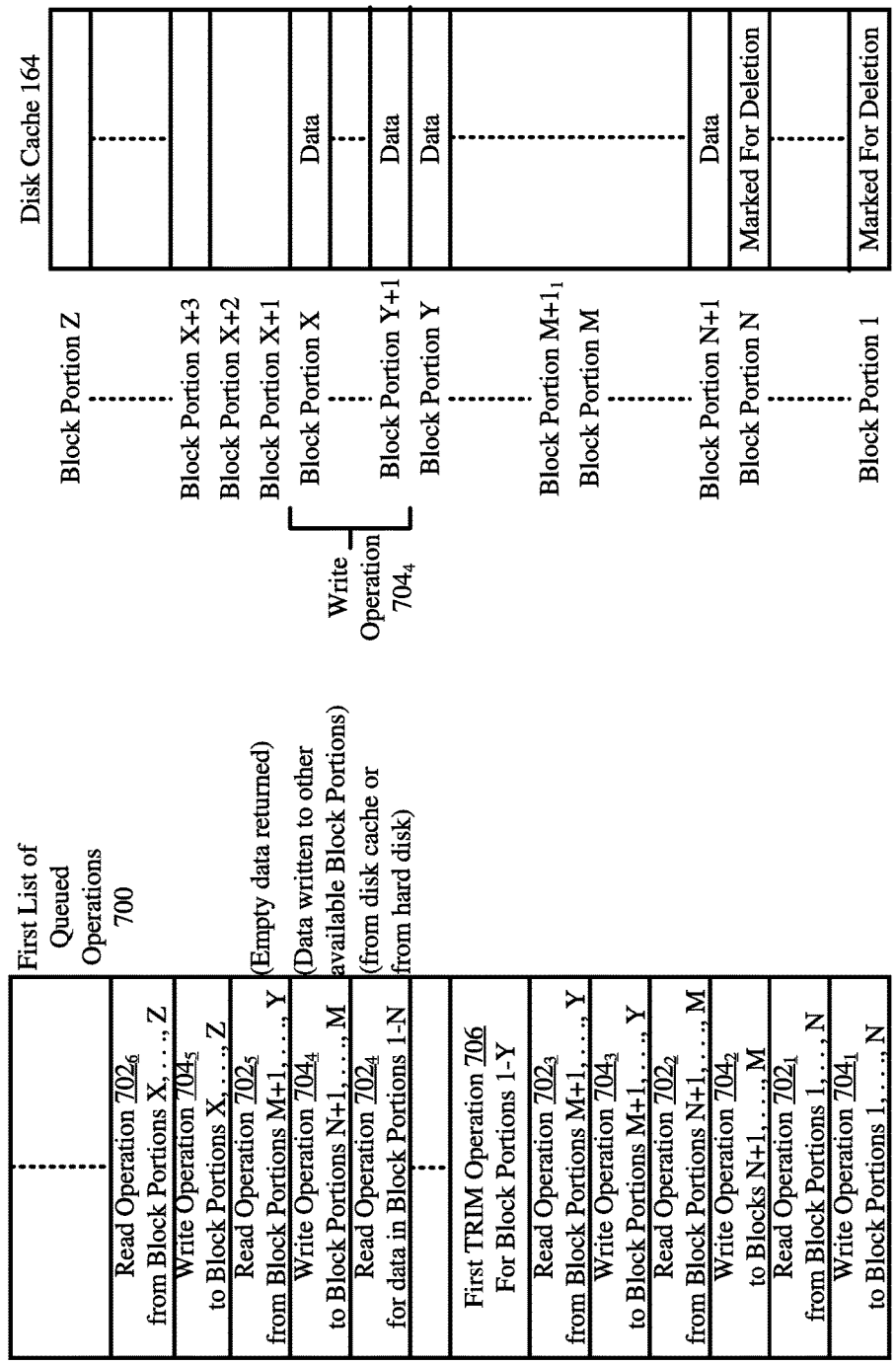
FIG. 11 is an illustration of the first illustrative queued operations list having more queued operations than that shown in FIG. 7.
FIG. 12 is an illustration of a disk cache having data written thereto in accordance with write operations contained in the queued operations list of FIG. 11.

As shown in FIG. 6B, 626 involves receiving requests for second and third I/O operations, and queueing the same in the first list contained in the data cache. FIG. 11 shows the first list 700 having second I/O operations $702_4$, $704_4$, $702_5$ and third I/O operations $704_5$, $702_6$ queued therein. In 628, an estimate is determined for a second amount of time to complete each second I/O operation. A value of a second threshold is set in 630 based on the estimated second amount of time(s). For example, the second threshold value is set to be equal to the estimated second amount of time or is set to be equal to the smallest or largest estimated second amount of time. Next in 632, an estimate is determined for a third amount of time to complete the third TRIM operation (e.g., third TRIM operation 1002 of FIG. 10). If the estimated third amount of time is less than the second threshold value [634:YES], then method 600 continues with 636 where the second I/O operations are performed followed by the third TRIM operation. After completing the third TRIM operations, method 600 returns to 604.

In contrast if the estimated third amount of time is greater than the second threshold value [634:NO], then method 600 continues with 638 where the second I/O operations are performed. If the second I/O operation is a read operation (e.g., read operation $702_4$ of FIG. 11) for the first block portion (i.e., data in block portions of the disk cache that are marked for deletion), then the data is read (a) from the disk cache if it has not yet been erased therefrom or (b) from a memory or the hard disk depending on whether it has been flushed out of the disk cache to the hard disk. If the second I/O operation is a write operation for the first block portions (write operation $704_4$ of FIG. 11), then it is redirected to other available block portions of the disc cache (e.g., block portions Y+1, . . . , X of FIG. 12). If the second I/O operation is a read operation e.g., read operation $702_5$ of FIG. 11) from the second block portion (i.e., a block portion which has yet to be trimmed in accordance with the third TRIM operation), then an empty data set is returned.

Upon completing the second I/O operations, 640 is performed where an estimate is determined for a third amount of time to complete each of the third I/O operations (e.g., third I/O operations $704_5$, $702_6$ of FIG. 11). A value of a third threshold is set based on the estimated third amount of times(s). If the estimated third amount of time is less than the third threshold value [642:YES], then the third I/O operations are performed followed by the third TRIM operation, as shown by 644. Upon completing the third TRIM operations, method 600 returns to 604. FIGS. 13-14 comprise illustrations useful for understanding operations of 644. In contrast, if the estimated third amount of time is greater than the third threshold value [642:NO], then 646 is performed where method 600 ends or other processing is performed (e.g., return to 626).

As should be understood, the present solution is not limited to the particulars of method 600. For example, some of the operations of 604-644 can be performed concurrently and/or in a different order than that shown in FIG. 6. Accordingly, method 600 can be modified in accordance with a particular application.

The present solution can be employed in various applications, in addition to those discussed above. For example, the dynamic TRIM processing of the present solution can be applied to non-temporary data systems where the writes are written to the system disk. However, in this case, as the cache fills up, writes are more frequently to the system disk as compared to the temporary cache disk case, leaving more space to smooth out any large TRIM operations. The trimmed blocks and any non-committed write blocks will eventually have to be passed through to the system disk to maintain integrity. So, there may be a slower system shutdown. However, deferring the larger operations helps maintain system responsiveness while users are actively using the system. Also, in this case, one must be careful with write to areas that have overlapping trimmed areas. SSDs cannot simply overwrite existing data, so any valid data in that area that need to be overwritten needs to be copied before the old blocks can be erased. In those cases, the overlapping trimmed areas are sent to the system disk to prevent old invalid data from being copied around.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:
1. A method for handling operation requests in a computing device, comprising:
   queuing at least one first Input/Output ("I/O") operation and a first TRIM operation in a first list of operations to be performed by the computing device;
   analyzing the first TRIM operation for a plurality of block portions to determine a size thereof;
   estimating a first amount of time to complete the first TRIM operation;
   comparing the first amount of time to a first threshold value;
   selectively dividing the first TRIM operation into at least a second TRIM operation for first block portions contained in the plurality of block portions of a disk cache and at least a third TRIM operation for second block portions contained in the plurality of block portions of the disk cache, if the first amount of time is greater than the first threshold value;
   performing the at least one first I/O operation followed by the second TRIM operation; and
   queuing the third TRIM operation in a second list of operations to be performed by the computing device.

2. The method according to claim 1, wherein the at least one first I/O operation comprises a read operation from the disk cache or a write operation to the disk cache.

3. The method according to claim 1, further comprising performing the at least one first I/O operation followed by the first TRIM operation, if the first amount of time is less than the first threshold value.

4. The method according to claim 1, wherein an estimated amount of time to complete the second TRIM operation is less than the first threshold value.

5. The method according to claim 1, further comprising queuing at least one second I/O operation in the first list.

6. The method according to claim 4, further comprising:
estimating a second amount of time to complete the at least one second I/O operation;
setting a value of a second threshold value based on the second amount of time;
estimating a third amount of time to complete the third TRIM operation; and
determining if the third amount of time is less than the second threshold value.

7. The method according to claim 5, further comprising performing the second I/O operation followed by the third TRIM operation if the third amount of time is less than the second threshold value.

8. The method according to claim 5, further comprising performing the second I/O operation comprising a write operation for writing data to the first block portions, where the data is written to other block portions of the disk cache that are not contained in the first and second block portions.

9. The method according to claim 5, further comprising performing the second I/O operation comprising a read operation for reading data in the second block portion, and returning an empty data set.

10. The method according to claim 5, further comprising performing the second I/O operation comprising a read operation for reading data in the first block portion, where the data is read (a) from the disk cache if it has not yet been erased therefrom or (b) from a memory or hard disk depending on whether the data has been flushed out of the disk cache to the hard disk.

11. A system, comprising:
a processor; and
a non-transitory computer-readable storage medium comprising programming instructions that are configured to cause the processor to implement a method for handling operation requests in a computing device, wherein the programming instructions comprise instructions to:
queue at least one first Input/Output ("I/O") operation and a first TRIM operation in a first list of operations to be performed by the computing device;
analyze the first TRIM operation for a plurality of block portions to determine a size thereof;
estimate a first amount of time to complete the first TRIM operation;
compare the first amount of time to a first threshold value;
selectively divide the first TRIM operation into at least a second TRIM operation for first block portions contained in the plurality of block portions of a disk cache and at least a third TRIM operation for second block portions contained in the plurality of block portions of the disk cache, if the first amount of time is greater than the first threshold value;
perform the at least one first I/O operation followed by the second TRIM operation; and
queue the third TRIM operation in a second list of operations to be performed by the computing device.

12. The system according to claim 11, wherein the at least one first I/O operation comprises a read operation from the disk cache or a write operation to the disk cache.

13. The system according to claim 11, wherein the programming instructions comprise instructions to perform the at least one first I/O operation followed by the first TRIM operation, if the first amount of time is less than the first threshold value.

14. The system according to claim 11, wherein an estimated amount of time to complete the second TRIM operation is less than the first threshold value.

15. The system according to claim 11, wherein the programming instructions comprise instructions to queue at least one second I/O operation in the first list.

16. The system according to claim 14, wherein the programming instructions comprise instructions to:
estimate a second amount of time to complete the at least one second I/O operation;
set a value of a second threshold value based on the second amount of time;
estimate a third amount of time to complete the third TRIM operation; and
determine if the third amount of time is less than the second threshold value.

17. The system according to claim 15, wherein the programming instructions comprise instructions to perform the second I/O operation followed by the third TRIM operation if the third amount of time is less than the second threshold value.

18. The system according to claim 15, wherein the programming instructions comprise instructions to perform the second I/O operation comprising a write operation for writing data to the first block portions, where the data is written to other block portions of the disk cache that are not contained in the first and second block portions.

19. The system according to claim 15, wherein the programming instructions comprise instructions to perform the second I/O operation comprising a read operation for reading data in the second block portion, and returning an empty data set.

20. The system according to claim 15, wherein the programming instructions comprise instructions to perform the second I/O operation comprising a read operation for reading data in the first block portion, where the data is read (a) from the disk cache if it has not yet been erased therefrom or (b) from a memory or hard disk depending on whether the data has been flushed out of the disk cache to the hard disk.

* * * * *